(12) United States Patent
Peroulas et al.

(10) Patent No.: US 8,731,104 B2
(45) Date of Patent: May 20, 2014

(54) APPARATUS AND METHOD FOR COMPENSATING FOR CLIPPING POWER LOSSES

(75) Inventors: James Peroulas, St. Louis, MO (US); Qun Liao, Shenzhen (CN)

(73) Assignee: ZTE Wistron Telecom AB, Stockholm (SE)

( * ) Notice: Subject to any disclaimer, the term of this patent is extended or adjusted under 35 U.S.C. 154(b) by 405 days.

(21) Appl. No.: 13/255,711

(22) PCT Filed: Mar. 9, 2009

(86) PCT No.: PCT/CN2009/070699
§ 371 (c)(1),
(2), (4) Date: Oct. 14, 2011

(87) PCT Pub. No.: WO2010/102440
PCT Pub. Date: Sep. 16, 2010

(65) Prior Publication Data
US 2012/0020429 A1    Jan. 26, 2012

(51) Int. Cl.
*H04L 27/00* (2006.01)
(52) U.S. Cl.
USPC .......................................... 375/296; 375/297
(58) Field of Classification Search
CPC ........ H04B 1/00; H04B 1/0475; H04L 27/00; H04L 27/01; H04L 27/2623
USPC ................................................ 375/295, 296
See application file for complete search history.

(56) References Cited

U.S. PATENT DOCUMENTS

| 7,024,608 | B2 | 4/2006 | Kurokami | |
|---|---|---|---|---|
| 2001/0045988 | A1* | 11/2001 | Yamauchi et al. | 348/273 |
| 2003/0104792 | A1* | 6/2003 | Doi | 455/115 |
| 2006/0030352 | A1* | 2/2006 | Kiran et al. | 455/522 |
| 2006/0105723 | A1* | 5/2006 | Anvari | 455/114.2 |
| 2006/0171486 | A1 | 8/2006 | Tan | |
| 2007/0140376 | A1 | 6/2007 | Kang | |
| 2008/0285432 | A1* | 11/2008 | Ueng et al. | 370/203 |
| 2009/0310704 | A1* | 12/2009 | Jethanandani et al. | 375/296 |

FOREIGN PATENT DOCUMENTS

| CN | 1643864 A | 7/2005 |
|---|---|---|
| CN | 101162939 A | 4/2008 |
| JP | 2007-251909 | 9/2007 |

OTHER PUBLICATIONS

International Search Report for PCT/CN2009/070699, Completed by the Chinese Patent Office on Sep. 27, 2009, 2 Pages.
International Preliminary Report on Patentability for PCT/CN2009/070699 dated Sep. 13, 2011.

* cited by examiner

*Primary Examiner* — Shuwang Liu
*Assistant Examiner* — Ross Varndell
(74) *Attorney, Agent, or Firm* — Brooks Kushman P.C.

(57) ABSTRACT

An apparatus and method for compensating for transmit power losses that are caused by the addition of a clipping or crest factor reduction module in the TX path of a communications system. The method includes applying a gain to a signal input into the crest factor reduction module, so that a power of a signal output from the crest factor reduction module is equal to a power of a signal output from a baseband signal generation module in the TX chain. The apparatus and method have the benefit that the peaks of the signal to be transmitted will be consistent over a wide range of TX power values.

18 Claims, 5 Drawing Sheets

Closed loop embodiment of the invention

Figure 1. Typical communications TX chain which includes a CFR module (Prior Art)

Figure 2. Post CFR gain compensation (Prior Art)

Figure 3. Closed loop embodiment of the invention

Figure 4. Open loop embodiment of the invention

Figure 5. Example CFR gain function f()

Figure 6. Example CFR gain function f()

Figure 7. Example CFR gain function f()

APPARATUS AND METHOD FOR COMPENSATING FOR CLIPPING POWER LOSSES

CROSS-REFERENCE TO RELATED APPLICATION

This application is the U.S. national phase of PCT Application No. PCT/CN2009/070699 filed Mar. 9, 2009, the disclosure of which is incorporated in its entirety by reference herein.

TECHNICAL FIELD

The present invention relates to a communication system, especially to an apparatus and method for compensating for clipping power losses in the communication system.

BACKGROUND OF THE RELATED ARTS

Figure 1:
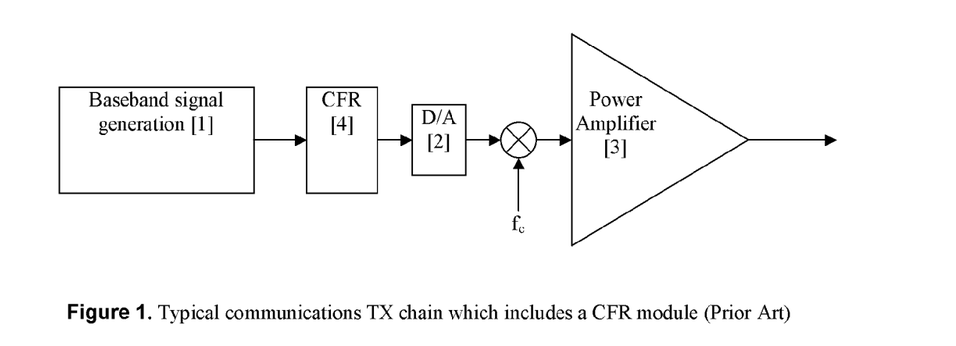
FIG. 1 shows a typical communication TX chain which includes a CFR module (Prior Art)

FIG. 1 shows a typical transmit lineup used in a communications system. A baseband signal is generated [1] which can theoretically be shifted up to a desired carrier frequency and transmitted through the communications medium. However, modern communications systems use amplitude modulation which produces a signal with a large peak to average ratio (PAR). The PAR is also known as the crest factor (CF) of a signal. A signal with a large PAR is difficult to amplify in a real world transmitter because it places stringent requirements on the analog components of the TX path. Specifically, a D/A [2] needs more dynamic range and a power amplifier (PA) [3] becomes very inefficient.

Very often, a crest factor reduction (CFR) module [4] is inserted in the TX lineup. The purpose of the CFR module [4] (also sometimes called a clipping module) is to reduce the PAR of the signal while introducing as few distortions into the signal as possible. Several different CFR algorithms are in existence, but one factor many have in common is that the gain of the CFR module is not constant. For example, it may be that at low TX power levels, the gain of the CFR module is 0 dB. However, at high TX power levels, the gain of the CFR module may be −0.9 dB.

This presents a problem because it is difficult for the baseband signal generation module [1] to guarantee the actual signal power level that will be delivered to the communications medium. The actual TX power level may be lower or even higher than what the baseband signal generator assumes it to be. From a system performance perspective, it would be better if there was a method to guarantee that the gain of the TX path remains constant.

Figure 2:
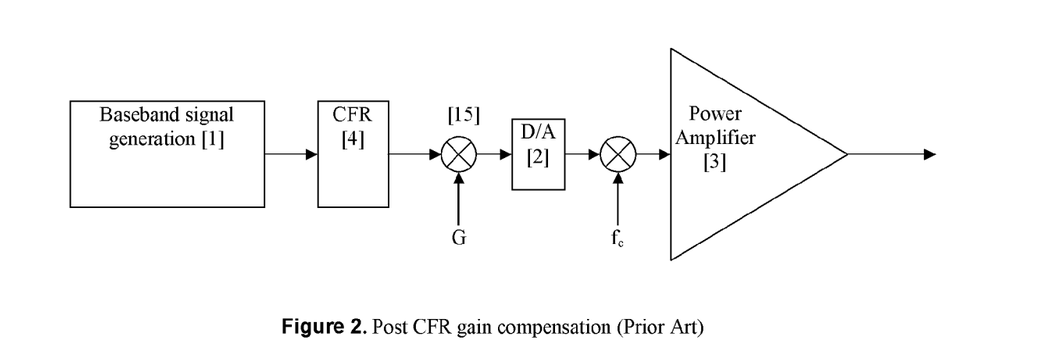
FIG. 2 shows post CFR gain compensation (Prior Art)

One method that is often used to correct for the gain error of the CFR module is to add a gain module [15] after the CFR module [4], as can be seen in FIG. 2. In the gain module [15], a gain is applied that is equal in value and opposite in sign to the gain going through the CFR module [4]. Thus, the overall gain of the CFR module [4] and the gain module [15] together will be 0 dB.

One of the beneficial features of typical CFR modules is that for a wide range of average input power values, the peak instantaneous value on the output of the CFR module remains more or less constant, or at most changes very slightly. For example, when transmitting at the maximum rated power of the transmitter, the average power on the output of the CFR module may be −13 dB with the peaks located at approximately −5 dB. If the average TX power is reduced to −15 dB, the peaks on the output of a typical CFR module will still be typically located around −5 dB.

The fact that the peak instantaneous power values coming out of the CFR module are constant for a wide range of TX power values is of beneficial to all the components that come after the CFR module. For example, if the peak power values are more or less constant, less headroom is required by the D/A converter [2] since no margin is needed to cover varying peak power levels.

The problem with the prior art described in FIG. 2 is that because the gain of the gain multiplier [15] will be changing, the peak values coming out of the gain multiplier will not be consistent and will vary in time. This places more difficult requirements on the D/A converter [2] and even may place more difficult requirements on a digital predistortion (DPD) system that may be present in the TX lineup.

There is a need for technical solutions for which the peaks of the signal being transmitted is consistent over a wide range of TX power values.

SUMMARY OF THE INVENTION

An object of the present invention is to provide an apparatus for compensating for clipping power losses, which has the benefit that the peaks of the signal to be transmitted will be consistent over a wide range of TX power values. The apparatus comprises: a gain multiplier for applying a gain to a signal input into a crest factor reduction module in a TX chain, so that a power of a signal output from the crest factor reduction module is equal to a power of a signal output from a baseband signal generation module in the TX chain, wherein the gain multiplier is arranged between the baseband signal generation module and the crest factor reduction module.

In accordance with a certain embodiment of the invention, the apparatus further comprises: a device for calculating the gain by using the power of the signal output from the baseband signal generation module and the power of the signal output from the crest factor reduction module, and outputting the calculated gain to the gain multiplier.

In accordance with a further embodiment of the invention, the apparatus further comprises: a first power estimator for estimating the power of the signal output from the baseband signal generation module and outputting the estimated power of the signal output from the baseband signal generation module to the device; and a second power estimator for estimating the power of the signal output from the crest factor reduction module and outputting the estimated power of the signal output from the crest factor reduction module to the device.

In accordance with a further embodiment of the invention, the device performs an iteration algorithm to calculate the gain.

In accordance with a further embodiment of the invention, the iteration algorithm is given by $G(n+1)=G(n)+alpha*(P_{BB}(n)-P_{CFR}(n))$, wherein $P_{BB}$ is the power of the signal output from the baseband signal generation module, $P_{CFR}$ is the power of the signal output from the crest factor reduction module, $G(0)$ is set to 0 dB, n is a iteration time, and alpha is set according to gain characteristics of the crest factor reduction module.

In accordance with a further embodiment of the invention, the calculated gain is specified to be within but never fall outside of a specified range.

In accordance with a still further embodiment of the invention, the apparatus further comprises: a device for calculating the gain by using the power of the signal output from the baseband signal generation module, and outputting the calculated gain to the gain multiplier, wherein in the TX chain a gain of the crest factor reduction module is a function of a power of the signal input into the crest factor reduction module.

In accordance with a further embodiment of the invention, the apparatus further comprises: a power estimator for estimating the power of the signal output from the baseband signal generation module and outputting the estimated power to the device.

In accordance with a further embodiment of the invention, the device further comprises: a means for receiving the power of the signal output from the baseband signal generation module and outputting the calculated gain corresponding to the power of the signal output from the baseband signal generation module to the gain multiplier by looking up a table, the table being produced by the device to map the power of the signal output from the baseband signal generation module to the calculated gain and stored in the means.

In accordance with a further embodiment of the invention, the function is stored in the device, and the device calculates the gain to be applied to the signal input into the crest factor reduction module, by using the function stored in the device and the power of the signal output from the baseband signal generation module, so that an overall gain of a cascade of the gain multiplier and the crest factor reduction module is 0 dB.

In accordance with a further embodiment of the invention, the device calculates a value of the gain by subtracting a first power which is equal to the power of the signal output from the baseband signal generation module from a second power, the second power is a horizontal coordinate value of an intersection of a line with a slope of −1 dB and a curve of the function, the line with a slope of −1 dB passes through an intersection of a vertical line with a horizontal coordinate value of the power of the signal output from the baseband signal generation module and a horizontal line with a vertical coordinates value of 0 dB.

In accordance with a further embodiment of the invention, when the line with the slope of −1 dB and the curve of the function have multiple intersections, the second power is set to a horizontal coordinate value of one intersection with the horizontal coordinate nearest to the power of the signal output from the baseband signal generation module.

Another object of the present invention is to provide an apparatus for compensating for clipping power losses, which has the benefit that the peaks of the signal to be transmitted will be consistent over a wide range of TX power values. The apparatus comprises: a gain compensation device, the gain compensation device being configured to calculate a gain by using a power of a signal output from a baseband signal generation module in a TX chain and a power of a signal output from a crest factor reduction module in the TX chain, and apply the calculated gain to a signal input into the crest factor reduction module, so that the power of the signal output from the crest factor reduction module is equal to the power of the signal output from the baseband signal generation module.

In accordance with a certain embodiment of the invention, the gain compensation device is configured to perform an iteration algorithm for calculating the gain.

In accordance with a further embodiment of the invention, the iteration algorithm is given by $G(n+1)=G(n)+\text{alpha}*(P_{BB}(n)-P_{CFR}(n))$, wherein $P_{BB}$ is the power of the signal output from the baseband signal generation module, $P_{CFR}$ is the power of the signal output from the crest factor reduction module, $G(0)$ is set to 0 dB, n is a iteration time, and alpha is set according to gain characteristics of the crest factor reduction module.

In accordance with a further embodiment of the invention, the calculated gain is specified to be within but never fall outside of a specified range.

A further object of the present invention is to provide an apparatus for compensating for clipping power losses, which has the benefit that the peaks of the signal to be transmitted will be consistent over a wide range of TX power values. The apparatus comprises: a gain compensation device, the gain compensation device being configured to calculate a gain by using a power of a signal output from a baseband signal generation module in a TX chain, and apply the gain to a signal input into a crest factor reduction module in the TX chain, so that a power of a signal output from the crest factor reduction module is equal to the power of the signal output from the baseband signal generation module, wherein in the TX chain a gain of the crest factor reduction module is a function of a power of the signal input into the crest factor reduction module.

In accordance with a certain embodiment of the invention, the gain compensation device is configured to produce a table to map the powers of the signal output from the baseband signal generation module to the calculated gains, and apply one of the calculated gains corresponding to one of the powers of the signal output from the baseband signal generation module by looking up the table.

In accordance with a further embodiment of the invention, the gain compensation device is configured to calculate a value of the gain by subtract a first power which is equal to the power of the signal output from the baseband signal generation module from a second power, the second power is a horizontal coordinate value of an intersection of a line with a slope of −1 dB and a curve of the function, the line with a slope of −1 dB passes through a intersection of a vertical line with a horizontal coordinate value of the power of the signal output from the baseband signal generation module and a horizontal line with a vertical coordinates value of 0 dB.

In accordance with a further embodiment of the invention, when the line with the slope of −1 dB and the curve of the function have multiple intersections, the second power is set to a horizontal coordinate value of one intersection with the horizontal coordinate nearest to the power of the signal output from the baseband signal generation module.

An another object of the present invention is to provide a method for compensating for clipping power losses, which has the benefit that the peaks of the signal to be transmitted will be consistent over a wide range of TX power values. The method comprises: applying a gain to a signal input into a crest factor reduction module in a TX chain, so that a power of a signal output from the crest factor reduction module is equal to a power of a signal output from a baseband signal generation module in the TX chain.

In accordance with a further embodiment of the invention, the method further comprises: calculating the gain by using the power of the signal output from the baseband signal generation module and the power of the signal output from the crest factor reduction module.

In accordance with a further embodiment of the invention, in the step of calculating, the gain is calculated by performing an iteration algorithm.

In accordance with a further embodiment of the invention, the iteration algorithm is given by $G(n+1)=G(n)+\text{alpha}*(P_{BB}(n)-P_{CFR}(n))$, wherein $P_{BB}$ is the power of the signal output from the baseband signal generation module, $P_{CFR}$ is the power of the signal output from the crest factor reduction module, $G(0)$ is set to 0 dB, n is a iteration time, and alpha is set according to gain characteristics of the crest factor reduction module.

In accordance with a further embodiment of the invention, the calculated gain is specified to be within but never fall outside of a specified range.

In accordance with a further embodiment of the invention, the method further comprises: calculating the gain by using the power of the signal output from the baseband signal generation module, wherein in the TX chain a gain of the crest factor reduction module is a function of a power of the signal input into the crest factor reduction module.

In accordance with a further embodiment of the invention, in the step of calculating, the gain is calculated by using the function and the power of the signal output from the baseband signal generation module, so that an overall gain of the calculated gain adding the gain of the crest factor reduction module is 0 dB.

In accordance with a further embodiment of the invention, the gain is calculated by subtracting a first power which is equal to the power of the signal output from the baseband signal generation module from a second power, the second power is a horizontal coordinate value of a intersection of a line with a slope of −1 dB and a curve of the function, the line with a slope of −1 dB passes through a intersection of a vertical line with a horizontal coordinate value of the power of the signal output from the baseband signal generation module and a horizontal line with a vertical coordinates value of 0 dB.

In accordance with a further embodiment of the invention, when the line with the slope of −1 dB and the curve of the function have multiple intersections, the second power is set to a horizontal coordinate value of one intersection with the horizontal coordinate nearest to the power of the signal output from the baseband signal generation module.

A further object of the present invention is to provide a method for compensating for clipping power losses, which has the benefit that the peaks of the signal to be transmitted will be consistent over a wide range of TX power values. The method comprises: calculating a gain by using a power of a signal output from a baseband signal generation module in a TX chain and a power of a signal output from a crest factor reduction module in the TX chain; and applying the calculated gain to a signal input into the crest factor reduction module, so that the power of the signal output from the crest factor reduction module is equal to the power of the signal output from the baseband signal generation module.

In accordance with a certain embodiment of the invention, in the step of calculating, the gain is calculated by using an iteration algorithm.

In accordance with a further embodiment of the invention, the iteration algorithm is given by $G(n+1)=G(n)+alpha*(P_{BB}(n)-P_{CFR}(n))$, wherein $P_{BB}$ is the power of the signal output from the baseband signal generation module, $P_{CFR}$ is the power of the signal output from the crest factor reduction module, $G(0)$ is set to 0 dB, n is a iteration time, and alpha is set according to gain characteristics of the crest factor reduction module.

In accordance with a further embodiment of the invention, the calculated gain is specified to be within but never fall outside of a specified range.

A further object of the present invention is to provide a method for compensating for clipping power losses, which has the benefit that the peaks of the signal to be transmitted will be consistent over a wide range of TX power values. The method comprises: calculating a gain by using a power of a signal output from a baseband signal generation module in a TX chain; and applying the calculated gain to a signal input into a crest factor reduction module in the TX chain, so that a power of a signal output from the crest factor reduction module is equal to the power of the signal output from the baseband signal generation module, wherein in the TX chain a gain of the crest factor reduction module is a function of the power of the signal input into the crest factor reduction module.

In accordance with a certain embodiment of the invention, in the step of calculating, the gain is calculated by using the function and the power of the signal output from the baseband signal generation module, so that an overall gain of the calculated gain adding the gain of the crest factor reduction module is 0 dB.

In accordance with a further embodiment of the invention, the gain is calculated by subtracting a first power which is equal to the power of the signal output from the baseband signal generation module from a second power, the second power is a horizontal coordinate value of a intersection of a line with a slope of −1 dB and a curve of the function, the line with a slope of −1 dB passes through a intersection of a vertical line with a horizontal coordinate value of the power of the signal output from the baseband signal generation module and a horizontal line with a vertical coordinates value of 0 dB.

In accordance with a further embodiment of the invention, when the line with the slope of −1 dB and the curve of the function have multiple intersections, the second power is set to a horizontal coordinate value of one intersection with the horizontal coordinate nearest to the power of the signal output from the baseband signal generation module.

DETAILED DESCRIPTION OF THE INVENTION

Figure 3:
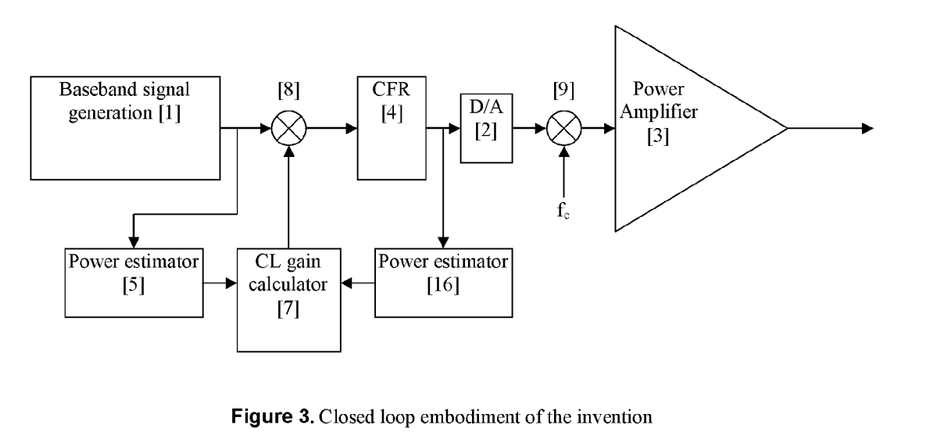
FIG. 3 shows a closed loop embodiment of the invention.

An embodiment is described with reference to FIG. 3. In this embodiment, the baseband signal generation module [1] creates a baseband version of the signal that should be transmitted over the communications medium. The output of this module is sent through the gain multiplier [8] which applies a gain to the signal so that the power on the output of the subsequent CFR module [4] will be equal to the power of the signal from the baseband generation module [1]. The output of the CFR module [4] is passed to the D/A converter [2] from which point it is shifted up in frequency using a mixer [9] and finally sent to the power amplifier [3].

Two power estimators [5] and [16] are used to estimate the power of the signal coming from the baseband generation module [1] and also the power of the signal coming out of the CFR module [4] respectively. Several algorithms are generally known that can be used to estimate the power of a signal. In one algorithm, the average of the square of the absolute value of several samples is computed. The number of samples to be averaged varies depending on the desired accuracy of the power estimator. Another algorithm is that the square of the absolute value of the signal may be sent through an alpha filter which performs long term averaging. By adjusting the alpha value of the filter, more averaging can be used to produce more and more accurate estimates of the power of the signal.

The power estimator [5] on the output of the baseband signal generator [1] will produce regular power estimates $P_{BB}(n)$ measured in dB. The power estimator [16] on the output of the CFR module [4] will produce regular power estimates $P_{CFR}(n)$ measured in dB. The closed loop gain calculator [7] will examine $P_{BB}(n)$ and $P_{CFR}(n)$ to determine the next gain value G(n+1) that should be used by the pre-CFR multiplier [8]. The update equation used by the closed loop gain calculator [7] is given by:

$$G(n+1)=G(n)+\text{alpha}*(P_{BB}(n)-P_{CFR}(n)) \qquad \text{Eq 1}$$

Where G(n), $P_{BB}$, and $P_{CFR}$ are expressed in dB and the initial value for G, ie G(0) is 0 dB. Alpha typically takes on values between 0 and 1 and can be used to trade off convergence against stability. The higher the value of alpha, the more quickly the algorithm will converge. The lower the value of alpha, the more stable the algorithm will be. And it should be noted that in some instances, depending on the gain characteristics of the CFR module, values greater than 1 may be suitable. In an example, alpha will take on a value around 0.8. In another example, if we have a rough idea of what the gain of the CFR will be for different power levels, we could use this information to allow the system to converge more rapidly.

In addition to the update procedure shown by Eq 1, some hard limits may be specified to make sure that the gain never falls outside a specified range. The reason for setting hard limits is that any power estimation module can possibly make power estimation mistakes. If enough mistakes are made, it is possible for the gain value to become very large or very small. One way to prevent this is to declare a maximum and a minimum possible gain value. Thus, even if there are many severe power estimation errors, the gain will stay within a reasonable range. For example, an upper limit and a lower limit may be specified for G(n). If any update produces a G(n) value above the upper limit, G(n) may be forced back to this upper limit. If any update produces a G(n) lower than the lower limit, G(n) may be forced back to this lower limit.

In an ideal situation where there are no power estimation errors, when $P_{BB}(n)$ is equal to $P_{CFR}(n)$, the iterative procedure will finish. Then the gain value G(n) used by the gain multiplier [8] will not be changed, until the gain of the CFR module [4] begins to change again. However, in practical situations, because power estimation modules are not perfect, the actual gain value will be constantly changing, even if the TX power is not changing. Thus, $P_{CFR}(n)$ will be constantly changing, but it will retain a value close to $P_{BB}(n)$.

There are many situations, where the gain of the CFR module is not simply a function of the power level on the input to the CFR module. There are situations where the gain is also a function of several other factors, such as, for example, the number of carriers being transmitted or the exact distribution of power among the different carriers. In such situations, the embodiment described in FIG. 3 is preferred because it can adaptively search out and find the optimal gain value that should be applied on the input to the CFR module. Furthermore, this embodiment is also applicable when the gain of the CFR module is a known and unchanging function of the average power of the signal coming into the CFR module.

Figure 4:
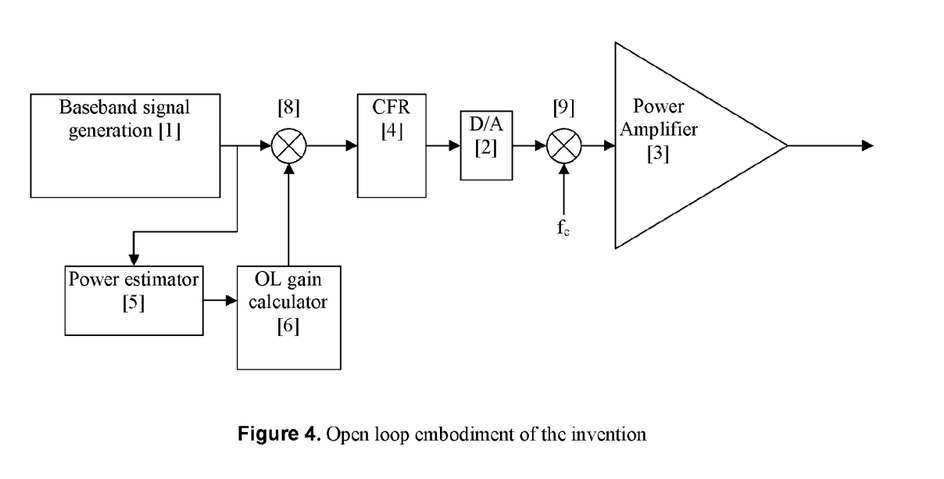
FIG. 4 shows an open loop embodiment of the invention.

Another embodiment of the invention is shown in FIG. 4. This embodiment is applicable when the gain of the CFR module is a known and unchanging function of the average power of the signal coming into the CFR module. In other words, this embodiment is applicable if the gain of the CFR module can be expressed as:

$$G_{CFR}=f(P_{CFR\_in}) \qquad \text{Eq 2}$$

Where $G_{CFR}$ is the gain of the CFR module, $P_{CFR\_in}$ is the average power of the signal coming into the CFR module, and f( ) is any function that is continuous in the range between 0 and the maximum expected value for $P_{CFR\_in}$.

The baseband signal generation module [1] creates a baseband version of the signal that should be transmitted over the communications medium. The output of this module is sent through a gain multiplier [8] which applies a gain to the signal so that the power of the signal output from the subsequent CFR module [4] will be equal to the power of the signal from the baseband signal generation module [1]. The output of the CFR module is passed to the D/A converter [2] from which point it is shifted up in frequency using a mixer [9] and finally sent to the power amplifier [3].

The output of the baseband signal generator [1] is also sent to a power estimation module [5] which attempts to estimate the power of the signal coming from the baseband signal generator [1]. Several algorithms are generally known that can be used to estimate the power of a signal. In one algorithm, the average of the square of the absolute value of several samples is computed. The number of samples to be averaged varies depending on the desired accuracy of the power estimator. Another algorithm is that the square of the absolute value of the signal may be sent through an alpha filter which performs long term averaging. By adjusting the alpha value of the filter, more averaging can be used to produce more and more accurate estimates of the power of the signal.

The output of the power estimation module [5] is sent to an open loop gain calculation module [6] which decides which gain value should be applied to the gain multiplier [8] so as to ensure that the power of the signal coming out of the CFR module [4] is equal to the power of the signal coming from the baseband signal generator [1].

Figure 5:
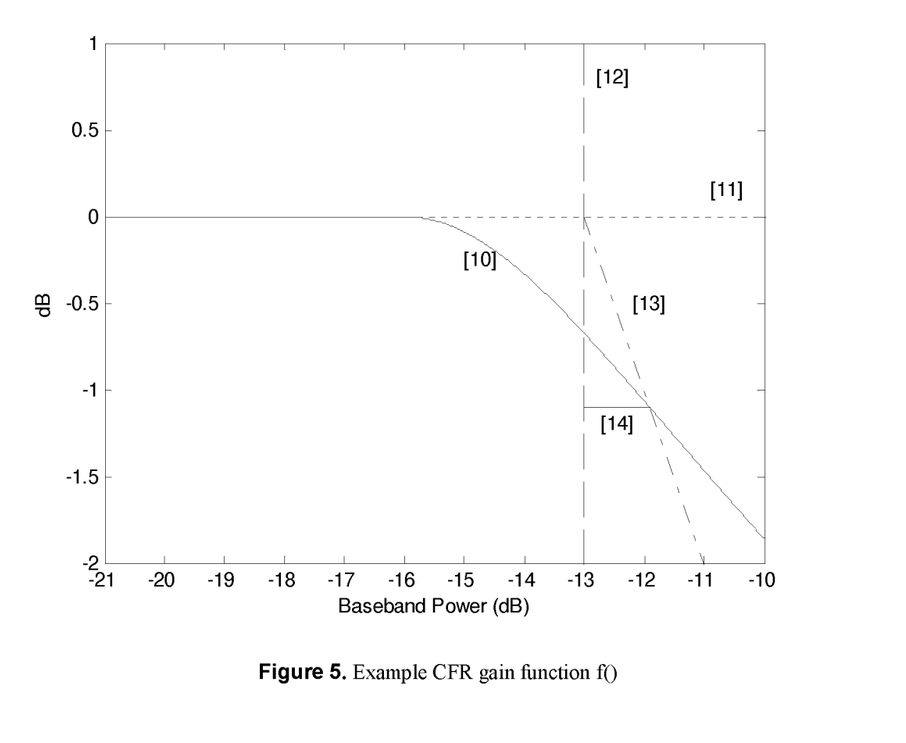
FIG. 5 shows an example with reference to a CFR gain function f( ) of the invention.

The procedure by which the gain value used by the gain multiplier [8] is calculated will be described graphically using FIG. 5. Line [10] represents a typical CFR gain curve where, in this example, the gain is 0 dB for CFR input power levels below −16 dB. Above −16 dB, the gain of the CFR module [4] begins to gradually decrease as the input power level is increased more and more. Please note that line [10] and −16 dB are 'typical' for the CFR modules in this example. Different CFR modules will have different curves.

Assume, for the purpose of the example, that the power level coming from the baseband signal generation module [1] is −13 dB and hence the desired power level on the output of the CFR module [4] is also −13 dB. Line [12] represents this baseband power level and it can be seen that if a signal with a −13 dB power level is placed on the input to the CFR module [4], the gain will be about −0.7 dB and the power of the output of the CFR module [4] will be about −13.7 dB.

Clearly, the power of the signal on the input to the CFR module [4] must be increased to compensate for this gain loss. However, it is not sufficient to increase the power of the signal coming into the CFR module [4] by 0.7 dB to −12.3 dB. A −12.3 dB power level appearing on the input to the CFR module [4] will cause the CFR module [4] to have a gain of approximately −0.9 dB, since at this input power level, the gain of the CFR module [4] decreases as the input power level increases. Thus, the power of the signal coming out of the CFR module [4] will be −12.3 dB −0.9 dB=−13.2 dB. This is closer to the desired output power of −13 dB, but not exactly correct.

To calculate the correct gain value that must be applied to the input of the CFR module [4], one must draw a line starting from the intersection of the vertical line [12] placed at the baseband power level of −13 dB and a horizontal line [11] at the gain of the CFR module [4] of 0 dB. This line will have a slope such that there is a −1 dB change in the y direction for every +1 dB change in the x direction and is indicated in FIG. 5 by line [13].

The intersection between line [13] and line [10] represents the desired operating point. In the current example, this intersection is approximately located at (−11.9, −1.1). This means that if the signal input to the CFR module [4] has a power of −11.9 dB, the gain of the CFR module [4] will be −1.1 dB and the output of the CFR module [4] will have a power of −13 dB, as desired. Thus, the gain that should be applied to the input of the CFR module [4] is represented by the length of line [14], which is 1.1 dB.

It is noted that the overall gain of the gain multiplier and CFR module is:

$$\text{OverallGain} = G + f(P_{BB} + G) \qquad \text{Eq 3}$$

Where G, $P_{BB}$, and f( ) are all expressed in dB. Since it is desired that the overall gain be 0 dB, mathematically, one needs to find the value of G such that:

$$G = -f(P_{BB} + G) \qquad \text{Eq 4}$$

The length of line [14] is the solution to the above equation.

Figure 6:
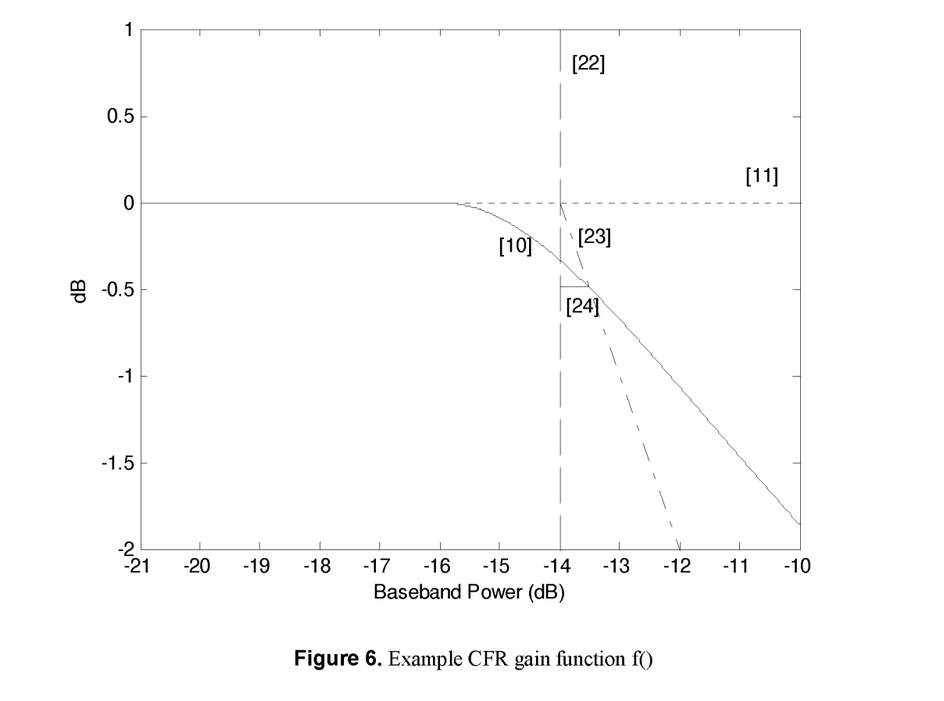
FIG. 6 shows another example with reference to the CFR gain function f( ) of the invention.

Another example is shown in FIG. 6 when the baseband power level is −14 dBFS. In this case, performing the same procedure described above, the gain before the CFR module should be set to +0.5 dB so that the output of the CFR module will have a power level of −14 dBFS.

Figure 7:
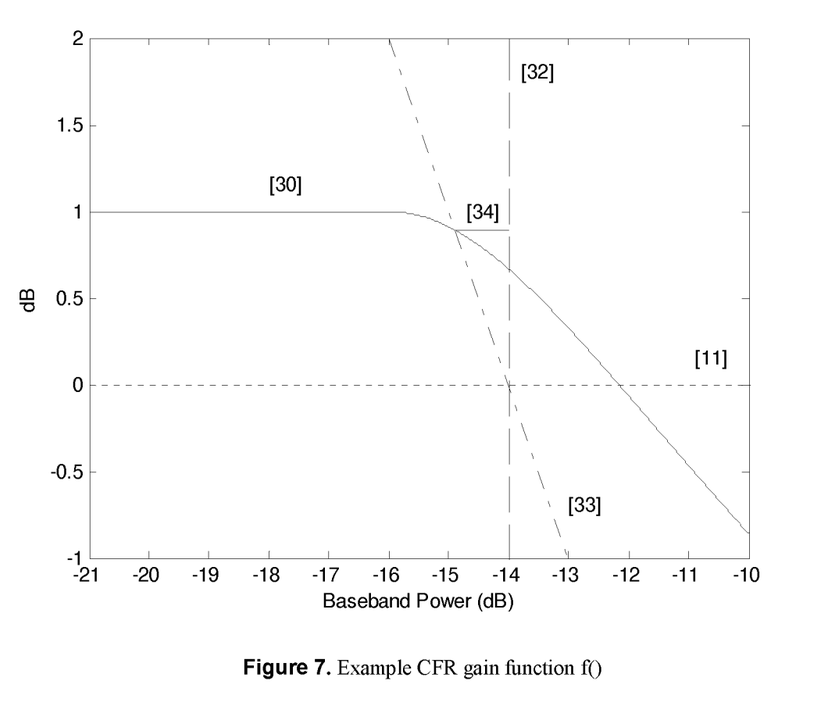
FIG. 7 shows an example with reference to another CFR gain function f( ) of the invention.

Another example is shown in FIG. 7 where the baseband power level is again −14 dBFS, however, in this case, the gain of the CFR module is positive and hence G must be set to a negative dB value so that the overall gain of the system will be 0 dB. In this example, the gain before the CFR module should be set to −0.9 dB so that the output of the CFR module will have a power level of −14 dBFS.

It should be noted that it is possible for line [13] (or line [23] or line [33]) and line [10] (or line 30) to intersect several times. In this case, any intersection is a valid solution, but in order to keep the power levels in the system as consistent as possible, it is best to choose the solution whose x coordinate is as close as possible to line [12] (or line [22] or line [32]). It is also possible for line [13] and line [10] to never intersect. In this situation, no solution is available, and it is not possible to adjust the gain of the signal coming into the CFR module [4] so that the cascade of the gain multiplier [8] and the CFR module [4] will produce an overall gain of 0 dB.

It should be noted that in this embodiment, the procedure by which the gain value used by the gain multiplier [8] is calculated is performed in the OL gain calculator, so the CFR gain function is stored in the OL gain calculator.

Although the procedure above was described through the use of graphical methods, the procedure could also easily be implemented using a computer. Furthermore, all the calculations for all the possible baseband power levels could be performed once, offline, that is, the calculations are done once by a computer which will produce a table mapping baseband power estimates to gain values. Then the calculated gain values are stored in the open loop gain calculator [6], so that the open loop gain calculator [6] is simply implemented as a lookup table. The currently estimated baseband signal power is used as an index into the lookup table and the value returned from the table is used directly as the gain for the multiplier [8] before the CFR module [4].

The invention has two main benefits. One benefit is that the invention will ensure that the gain of the full lineup of the entire TX chain will be constant, regardless of whether the gain of the CFR module is constant or not. Please note that this assumes that the overall gain of all the other modules in the TX chain is also of constant gain. This benefit can also be achieved by the prior art described in FIG. 2. Furthermore, this invention has the benefit that the peaks of the signal to be transmitted will be consistent over a wide range of TX power values, because the signal to be transmitted directly comes out of the CFR module. This will have a positive impact on the choice of D/A converter and also on any DPD circuit that may appear in the TX lineup. This benefit is the main benefit of the invention and can not be achieved by the prior art described in FIG. 2.

While several embodiments of the invention have been illustrated and described, it is not intended that these embodiments illustrate and describe all possible forms of the invention. Rather, the words used in the specification are words of description rather than limitation, and it is understood that various changes and modifications may be made without departing from the spirit and scope of the invention.

What is claimed is:

1. An apparatus for compensating for clipping power losses, comprising:
   a gain multiplier for applying a gain to a signal input into a crest factor reduction module in a TX chain, so that a power of a signal output from the crest factor reduction module is equal to a power of a signal output from a baseband signal generation module in the TX chain;
   a device for calculating the gain to the signal input into the crest factor reduction module by using the power of the signal output from the baseband signal generation module, and outputting the calculated gain to the gain multiplier, wherein in the TX chain the gain to the signal input into the crest factor reduction module is a function of a power of the signal input into the crest factor reduction module;
   wherein the function is stored in the device, and the device calculates the gain to be applied to the signal input into the crest factor reduction module, by using the function stored in the device and the power of the signal output from the baseband signal generation module, so that an overall gain of a cascade of the gain multiplier and the crest factor reduction module is 0 dB; wherein the device calculates the calculated gain by subtracting a first power which is equal to the power of the signal output from the baseband signal generation module from a second power, the second power is a horizontal coordinate value of an intersection of a line with a slope of −1 dB and a curve of the function, the line with a slope of −1 dB passes through an intersection of a vertical line with a horizontal coordinate value of the power of the signal output from the baseband signal generation module and a horizontal line with a vertical coordinates value of 0 dB;
   wherein the gain multiplier is arranged between the baseband signal generation module and the crest factor reduction module.

2. The apparatus according to claim 1, further comprising:
   a device for calculating the calculated gain by using the power of the signal output from the baseband signal generation module and the power of the signal output from the crest factor reduction module, and outputting the calculated gain to the gain multiplier.

3. The apparatus according to claim 2, further comprising:
a first power estimator for estimating the power of the signal output from the baseband signal generation module and outputting the estimated power of the signal output from the baseband signal generation module to the device; and
a second power estimator for estimating the power of the signal output from the crest factor reduction module and outputting the estimated power of the signal output from the crest factor reduction module to the device.

4. The apparatus according to claim 2, wherein the device performs an iteration algorithm to calculate the calculated gain.

5. The apparatus according to claim 4, wherein the iteration algorithm is given by $$G(n+1)=G(n)+\text{alpha}*(P_{BB}(n)-P_{CFR}(n)),$$

wherein $P_{BB}$ is the power of the signal output from the baseband signal generation module, $P_{CFR}$ is the power of the signal output from the crest factor reduction module, $G(0)$ is set to 0 dB, n is a iteration time, and alpha is set according to gain characteristics of the crest factor reduction module.

6. The apparatus according to claim 5, wherein the calculated gain is specified to be within but never fall outside of a specified range.

7. The apparatus according to claim 1, further comprising:
a power estimator for estimating the power of the signal output from the baseband signal generation module and outputting the estimated power to the device.

8. The apparatus according to claim 1, wherein the device further comprises:
a power estimator for receiving the power of the signal output from the baseband signal generation module and outputting the calculated gain corresponding to the power of the signal output from the baseband signal generation module to the gain multiplier by looking up a table, the table being produced by the device to map the power of the signal output from the baseband signal generation module to the calculated gain and stored in the power estimator.

9. The apparatus according to claim 8, wherein the function is stored in the device, and the device calculates the gain to be applied to the signal input into the crest factor reduction module, by using the function stored in the device and the power of the signal output from the baseband signal generation module, so that the overall gain of a cascade of the gain multiplier and the crest factor reduction module is 0 dB.

10. The apparatus according to claim 9, wherein the device calculates a value of the calculated gain by subtracting a first power which is equal to the power of the signal output from the baseband signal generation module from a second power, the second power is a horizontal coordinate value of an intersection of a line with a slope of −1 dB and a curve of the function, the line with a slope of −1 dB passes through an intersection of a vertical line with a horizontal coordinate value of the power of the signal output from the baseband signal generation module and a horizontal line with a vertical coordinates value of 0 dB.

11. The apparatus according to claim 10, wherein when the line with the slope of −1 dB and the curve of the function have multiple intersections, the second power is set to a horizontal coordinate value of one intersection with the horizontal coordinate nearest to the power of the signal output from the baseband signal generation module.

12. The apparatus according to claim 1, wherein when the line with the slope of −1 dB and the curve of the function have multiple intersections, the second power is set to a horizontal coordinate value of one intersection with the horizontal coordinate nearest to the power of the signal output from the baseband signal generation module.

13. A method for compensating for clipping power losses, comprising the step of:
applying a gain to a signal input into a crest factor reduction module in a TX chain, so that a power of a signal output from the crest factor reduction module is equal to a power of a signal output from a baseband signal generation module in the TX chain;
calculating the gain to the signal input into the crest factor reduction module by using the power of the signal output from the baseband signal generation module, wherein in the TX chain the gain to the signal input into the crest factor reduction module is a function of a power of the signal input into the crest factor reduction module;
wherein in the step of calculating, a calculated gain is calculated by using the function and the power of the signal output from the baseband signal generation module, so that an overall gain of the calculated gain adding the gain to the signal input into the crest factor reduction module is 0 dB;
wherein the calculated gain is calculated by subtracting a first power which is equal to the power of the signal output from the baseband signal generation module from a second power, the second power is a horizontal coordinate value of a intersection of a line with a slope of −1 dB and a curve of the function, the line with a slope of −1 dB passes through a intersection of a vertical line with a horizontal coordinate value of the power of the signal output from the baseband signal generation module and a horizontal line with a vertical coordinates value of 0 dB.

14. The method according to claim 13, further comprising:
calculating the calculated gain by using the power of the signal output from the baseband signal generation module and the power of the signal output from the crest factor reduction module.

15. The method according to claim 14, wherein in the step of calculating, the calculated gain is calculated by performing an iteration algorithm.

16. The method according to claim 15, wherein the iteration algorithm is given by $$G(n+1)=G(n)+\text{alpha}*(P_{BB}(n)-P_{CFR}(n)),$$

wherein $P_{BB}$ is the power of the signal output from the baseband signal generation module, $P_{CFR}$ is the power of the signal output from the crest factor reduction module, $G(0)$ is set to 0 dB, n is a iteration time, and alpha is set according to gain characteristics of the crest factor reduction module.

17. The method according to claim 16, wherein the calculated gain is specified to be within but never fall outside of a specified range.

18. The method according to claim 13, wherein when the line with the slope of −1 dB and the curve of the function have multiple intersections, the second power is set to a horizontal coordinate value of one intersection with the horizontal coordinate nearest to the power of the signal output from the baseband signal generation module.

* * * * *